United States Patent
Kamohara

(10) Patent No.: US 12,331,202 B2
(45) Date of Patent: Jun. 17, 2025

(54) INK JET INK COMPOSITION, IMAGE RECORDING METHOD, AND IMAGE RECORDED ARTICLE

(71) Applicant: FUJIFILM CORPORATION, Tokyo (JP)

(72) Inventor: Kazuo Kamohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 911 days.

(21) Appl. No.: 17/407,191

(22) Filed: Aug. 20, 2021

(65) Prior Publication Data

US 2021/0380827 A1 Dec. 9, 2021

Related U.S. Application Data

(63) Continuation of application No. PCT/JP2019/046827, filed on Nov. 29, 2019.

(30) Foreign Application Priority Data

Mar. 6, 2019 (JP) ................................ 2019-040324

(51) Int. Cl.
| | |
|---|---|
| C09D 11/101 | (2014.01) |
| B41J 11/00 | (2006.01) |
| C08F 2/48 | (2006.01) |
| C08F 2/50 | (2006.01) |
| C08F 220/18 | (2006.01) |
| C08F 220/34 | (2006.01) |
| C08F 224/00 | (2006.01) |
| C08F 226/06 | (2006.01) |
| C09D 11/107 | (2014.01) |
| C09D 11/322 | (2014.01) |
| C09D 11/324 | (2014.01) |
| C09D 11/38 | (2014.01) |

(52) U.S. Cl.
CPC ....... *C09D 11/101* (2013.01); *B41J 11/00214* (2021.01); *C08F 2/48* (2013.01); *C08F 2/50* (2013.01); *C08F 220/1811* (2020.02); *C08F 220/34* (2013.01); *C08F 224/00* (2013.01); *C08F 226/06* (2013.01); *C09D 11/107* (2013.01); *C09D 11/322* (2013.01); *C09D 11/324* (2013.01); *C09D 11/38* (2013.01)

(58) Field of Classification Search
CPC ... C09D 11/101; C09D 11/107; C09D 11/324; C09D 11/322; C09D 11/38; C08F 2/48; C08F 2/50; C08F 224/00; C08F 226/06; C08F 220/34; C08F 220/1811; B41J 11/00214

See application file for complete search history.

(56) References Cited

U.S. PATENT DOCUMENTS

| | | | |
|---|---|---|---|
| 5,629,359 A | 5/1997 | Peeters et al. | |
| 2015/0064398 A1 | 3/2015 | Umebayashi | |
| 2016/0193852 A1* | 7/2016 | Guenther | C09D 11/101 347/102 |

FOREIGN PATENT DOCUMENTS

| | | | | |
|---|---|---|---|---|
| CN | 104417111 A | | 3/2015 | |
| CN | 105431497 A | | 3/2016 | |
| CN | 113544224 B | * | 5/2023 | ........ B41J 11/00214 |
| GB | 2538619 A | | 11/2016 | |
| GB | 2561984 A | | 10/2018 | |
| GB | 2573207 A | | 10/2019 | |
| GB | 2574719 A | * | 12/2019 | ............. C09D 11/38 |
| GB | 2562169 B | | 6/2021 | |
| JP | 2004-314552 A | | 11/2004 | |

(Continued)

OTHER PUBLICATIONS

English language translation of the following: Office action dated Sep. 13, 2022 from the JPO in a Japanese patent application No. 2021-503402 corresponding to the instant patent application. This office action translation is submitted now in order to supplement the understanding of the cited references which are being disclosed in the instant Information Disclosure Statement.

International Search Report issued in International Application No. PCT/JP2019/046827 on Jan. 7, 2020.

Written Opinion of the ISA issued in International Application No. PCT/JP2019/046827 on Jan. 7, 2020.

(Continued)

*Primary Examiner* — Sophie Hon
(74) *Attorney, Agent, or Firm* — SOLARIS Intellectual Property Group, PLLC

(57) ABSTRACT

Provided are an ink jet ink composition containing a monomer A represented by formula (A), a monomer B that is a radical-polymerizable monomer including an alicyclic structure and not including a heterocyclic structure, and a monomer C that is a radical-polymerizable monomer including a heterocyclic structure, the total content of the monomer A, the monomer B, and the monomer C being 60 mass % or more relative to the total amount of the composition, and applications thereof. $R^1$ to $R^4$ each independently represent a hydrogen atom or an organic group having 1 to 10 carbon atoms, and n represents an integer of 1 to 3. When n is 2 or 3, two or three $R^3$'s may be the same or different, and two or three $R^4$'s may be the same or different.

(A)

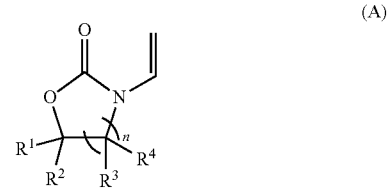

6 Claims, No Drawings

(56) References Cited

FOREIGN PATENT DOCUMENTS

| | | | |
|---|---|---|---|
| JP | 2016-529360 A | 9/2016 | |
| JP | 6316428 B2 | 4/2018 | |
| JP | 2018-070760 A | 5/2018 | |
| JP | 2018-115297 A | 7/2018 | |
| JP | 7256592 B2 * | 4/2023 | ........ B41J 11/00214 |
| WO | 2015/022228 A1 | 2/2015 | |
| WO | 2018/146259 A1 | 8/2018 | |
| WO | 2018/146494 A1 | 8/2018 | |
| WO | 2018/146495 A1 | 8/2018 | |
| WO | 2018/197852 A1 | 11/2018 | |

OTHER PUBLICATIONS

English language translation of the following: Office action dated May 18, 2022 from the SIPO in a Chinese patent application No. 201980093568.3 corresponding to the instant patent application. This office action translation is submitted now in order to supplement the understanding of the cited references which are being disclosed in the instant Information Disclosure Statement.

Extended European Search Report dated Mar. 21, 2022, issued in corresponding EP Patent Application No. 19918368.2.

* cited by examiner

INK JET INK COMPOSITION, IMAGE RECORDING METHOD, AND IMAGE RECORDED ARTICLE

CROSS-REFERENCE TO RELATED APPLICATIONS

This application is a continuation application of International Application No. PCT/JP2019/046827, filed Nov. 29, 2019, the disclosure of which is incorporated herein by reference in its entirety. Further, this application claims priority from Japanese Patent Application No. 2019-040324, filed Mar. 6, 2019, the disclosure of which is incorporated herein by reference in its entirety.

BACKGROUND OF THE INVENTION

1. Field of the Invention

The present disclosure relates to an ink jet ink composition, an image recording method, and an image recorded article.

2. Description of the Related Art

Various studies have been conducted on inks used for the recording of images.

For example, Japanese Patent No. 6316428 discloses an ink jet printing ink containing N-vinyloxazolidinone, the ink jet printing ink having high reactivity in radiation curing and low viscosity.

International Publication No. 2018/146495 discloses a method for recording an image on a polypropylene substrate or a corona-treated polystyrene substrate by an ink jet method. International Publication No. 2018/146495 discloses an ink jet ink used for this method, the ink jet ink containing isobornyl acrylate in an amount of 20 mass % or more relative to the total amount of the ink, N-vinylamide monomer, N-acryloylamine monomer, and/or N-vinyl carbamate in a total amount of 15 mass % to 30 mass % relative to the total amount of the ink, a resin, a photopolymerization initiator, and optionally a colorant.

SUMMARY OF THE INVENTION

An ink jet ink composition is sometimes required to have curability upon photoirradiation (hereinafter also referred to simply as "curability").

Furthermore, it is sometimes required to suppress stickiness of the surface in a high-temperature environment (e.g., an environment at 40° C.) of an image recorded using an ink jet ink composition.

Furthermore, an ink jet ink composition is sometimes required to have high ejectability from an ink jet head (hereinafter also referred to simply as "ejectability") as well as satisfy the above requirements.

An object of one aspect of the present disclosure is to provide an ink jet ink composition that can suppress stickiness of the surface of a recorded image in a high-temperature environment (e.g., an environment at 40° C.) and has high curability and high ejectability, an image recording method using the ink jet ink composition, and an image recorded article including an image that is a cured product of the ink jet ink composition.

Specific means for achieving the object include the following aspects.

<1> An ink jet ink composition contains
a monomer A that is a radical-polymerizable monomer represented by formula (A),
a monomer B that is a radical-polymerizable monomer including an alicyclic structure and not including a heterocyclic structure, and
a monomer C that is a radical-polymerizable monomer including a heterocyclic structure.
The total content of the monomer A, the monomer B, and the monomer C is 60 mass % or more relative to the total amount of the ink jet ink composition.

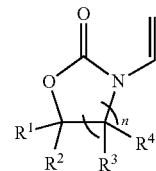

(A)

In formula (A), le to $R^4$ each independently represent a hydrogen atom or an organic group having 1 to 10 carbon atoms, and n represents an integer of 1 to 3. When n is 2 or 3, two or three leis may be the same or different, and two or three $R^4$'s may be the same or different.

<2> In the ink jet ink composition according to <1>, the content of the monomer A is 10 mass % to 30 mass % relative to the total amount of the ink jet ink composition.

<3> In the ink jet ink composition according to <1> or <2>, the content of the monomer B is 20 mass % to 40 mass % relative to the total amount of the ink jet ink composition.

<4> In the ink jet ink composition according to any one of <1> to <3>, the content of the monomer C is 20 mass % to 40 mass % relative to the total amount of the ink jet ink composition.

<5> In the ink jet ink composition according to any one of <1> to <4>, the total content of the monomer A and the monomer B is 35 mass % or more relative to the total amount of the ink jet ink composition.

<6> In the ink jet ink composition according to any one of <1> to <5>, the content of the monomer A is 15 mass % to 40 mass % relative to a total content of all radical-polymerizable monomers contained in the ink jet ink composition.

<7> The ink jet ink composition according to any one of <1> to <6> further contains a photopolymerization initiator.

<8> The ink jet ink composition according to any one of <1> to <7> further contains a colorant.

<9> An image recording method includes
a step of applying the ink jet ink composition according to any one of <1> to <8> to a substrate by an ink jet method, and
a step of irradiating the ink jet ink composition applied to the substrate with an active radiation.

<10> An image recorded article includes
a substrate, and
an image disposed on the substrate. The image is a cured product of the ink jet ink composition according to any one of <1> to <8>.

According to one aspect of the present disclosure, an ink jet ink composition that can suppress stickiness of the surface of a recorded image in a high-temperature environment (e.g., an environment at 40° C.) and has high curability and high ejectability, an image recording method using the ink jet ink composition, and an image recorded article including an image that is a cured product of the ink jet ink composition are provided.

DESCRIPTION OF THE PREFERRED EMBODIMENTS

In the present disclosure, a numerical range expressed using "to" means a range including numerical values before and after "to" as lower and upper limit values.

In the present disclosure, if there are two or more substances corresponding to one component in a composition, the amount of the component in the composition means the total amount of the two or more substances present in the composition unless otherwise specified.

In numerical ranges described in stages in the present disclosure, the upper limit value or the lower limit value described in one numerical range may be replaced with the upper limit value or the lower limit value of other numerical ranges described in stages or may be replaced with values described in Examples.

In the present disclosure, the term "step" encompasses not only an independent step but also a step that is not clearly distinguished from another step if the desired object of the step is achieved.

In the present disclosure, a combination of preferred embodiments is a more preferred embodiment.

In the present disclosure, "light" is a concept that encompasses active radiations such as γ-rays, β-rays, electron beams, ultraviolet radiation, and visible radiation.

In the present disclosure, ultraviolet radiation may be referred to as "UV (ultraviolet) light".

In the present disclosure, "(meth)acrylic acid" is a concept that encompasses both acrylic acid and methacrylic acid, "(meth)acrylate" is a concept that encompasses both acrylate and methacrylate, "(meth)acrylamide" is a concept that encompasses both acrylamide and methacrylamide, and "(meth)acryloyl group" is a concept that encompasses both an acryloyl group and a methacryloyl group.

In the present disclosure, "image" means all types of films formed using an ink jet ink composition, and "recording of an image" and "image recording" mean the formation of a film and film formation, respectively. Therefore, an "image" in the present disclosure is not limited to a film having a color and may be, for example, a transparent film. Here, regarding films, being transparent means that the transmittance of visible light having a wavelength of 400 nm to 700 nm is 80% or more (preferably 90% or more).

The concept of "image" in the present disclosure also encompasses solid images.

Ink Jet Ink Composition

An ink jet ink composition (hereinafter also referred to as simply an "ink") of the present disclosure is an ink that contains a monomer A that is a radical-polymerizable monomer represented by formula (A), a monomer B that is a radical-polymerizable monomer including an alicyclic structure and not including a heterocyclic structure, and a monomer C that is a radical-polymerizable monomer including a heterocyclic structure, the total content of the monomer A, the monomer B, and the monomer C being 60 mass % or more relative to the total amount of the ink.

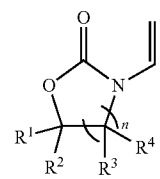

In formula (A), 1e to $R^4$ each independently represent a hydrogen atom or an organic group having 1 to 10 carbon atoms, and n represents an integer of 1 to 3. When n is 2 or 3, two or three 1es may be the same or different, and two or three $R^4$'s may be the same or different.

The ink of the present disclosure can suppress stickiness of the surface of a recorded image in a high-temperature environment (e.g., an environment at 40° C., hereinafter the same) and has high curability (i.e., curability upon photoirradiation) and high ejectability (i.e., ejectability from an ink jet head).

Here, the phrase "stickiness of the surface of a recorded image in a high-temperature environment can be suppressed" means that an image whose stickiness of the surface in a high-temperature environment is suppressed can be recorded.

In the present disclosure, stickiness of the surface of a recorded image in a high-temperature environment may be referred to simply as "surface stickiness", and the ability of an ink to suppress stickiness of the surface of a recorded image in a high-temperature environment may be referred to as "surface stickiness suppressibility".

In the present disclosure, stickiness of the surface means stickiness of the surface of an image placed in a high-temperature environment, the image being an image recorded as a result of curing of an ink (i.e., a cured ink).

In the present disclosure, curability means curability of an ink (i.e., the cure rate of an ink) at the stage of recording an image by curing the ink.

Thus, surface stickiness suppressibility and curability are properties related to each other but are not properties completely corresponding to each other.

Although not clear, the reason why the ink of the present disclosure produces the effect described above is generally presumed as follows.

In the ink of the present disclosure, the monomer A is considered to contribute mainly to curability.

In the ink of the present disclosure, the monomer B can contribute mainly to surface stickiness suppressibility (i.e., the ability to suppress the surface stickiness of a recorded image) and curability and, in particular, is considered to contribute greatly to surface stickiness suppressibility.

In the ink of the present disclosure, the monomer C can contribute mainly to ejectability and curability and, in particular, is considered to contribute greatly to ejectability.

In the ink of the present disclosure, the total content of the monomer A, the monomer B, and the monomer C is 60 mass % or more relative to the total amount of the ink. This can contribute to any of the effects of curability, surface stickiness suppressibility, and ejectability and, in particular, is considered to contribute greatly to curability and ejectability.

In the ink of the present disclosure, it is presumed that the above-described effects are produced by combining these features.

Hereinafter, components that may be contained in the ink of the present disclosure will be described.

Monomer A

The ink of the present disclosure contains at least one monomer A that is a radical-polymerizable monomer represented by formula (A) below.

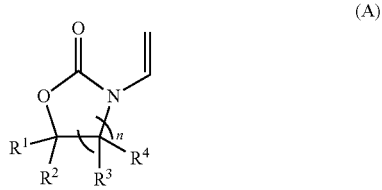

(A)

In formula (A), 1e to $R^4$ each independently represent a hydrogen atom or an organic group having 1 to 10 carbon atoms, and n represents an integer of 1 to 3. When n is 2 or 3, two or three 1es may be the same or different, and two or three $R^4$'s may be the same or different.

In formula (A), 1e to $R^4$ each independently represent a hydrogen atom or an organic group having 1 to 10 carbon atoms.

The number of carbon atoms of each of the organic groups represented by $R^1$ to $R^4$ is preferably 1 to 6, more preferably 1 or 2, still more preferably 1.

Each of the organic groups represented by $R^1$ to $R^4$ is preferably an alkyl group, an alkenyl group, an aryl group, or an aralkyl group, more preferably an alkyl group or an aryl group, still more preferably an alkyl group.

In formula (A), in a preferred embodiment, $R^1$ and $R^3$ are each independently a hydrogen atom or an organic group having 1 to 10 carbon atoms, and $R^2$ and $R^4$ are each a hydrogen atom, and in a more preferred embodiment, $R^1$ is a hydrogen atom or an organic group having 1 to 10 carbon atoms, and $R^2$ to $R^4$ are each a hydrogen atom.

Also in these embodiments, the preferred range of the organic group having 1 to 10 carbon atoms is as described above.

In formula (A), n represents an integer of 1 to 3. When n is 2 or 3, two or three $R^3$'s may be the same or different, and two or three 1es may be the same or different.

In formula (A), n is preferably 1 or 2, more preferably 1.

Specific examples of the radical-polymerizable monomer represented by formula (A) will be described below, but the radical-polymerizable monomer represented by formula (A) is not limited to the following specific examples.

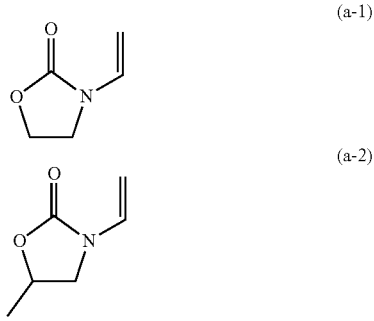

(a-1)

(a-2)

In the above specific examples, a compound (a-1) is N-vinyloxazolidinone (abbreviated as NVO), and a compound (a-2) is N-vinyl-5-methyloxazolidinone (abbreviated as NVMO).

The content of the monomer A is not particularly limited.

For further improvement of curability, the content of the monomer A relative to the total amount of the ink is preferably 5 mass % to 40 mass %, more preferably 10 mass % to 30 mass %, still more preferably 15 mass % to 25 mass %.

For further improvement of curability, the content of the monomer A relative to the total content of all radical-polymerizable monomers contained in the ink is preferably 10 mass % to 50 mass %, more preferably 15 mass % to 40 mass %, still more preferably 15 mass % to 35 mass %.

For further improvement of curability, the content of the monomer A relative to the total content of the monomer A, the monomer B, and the monomer C is preferably 10 mass % to 50 mass %, more preferably 15 mass % to 40 mass %, still more preferably 15 mass % to 35 mass %.

Monomer B

The ink of the present disclosure contains at least one monomer B that is a radical-polymerizable monomer including an alicyclic structure and not including a heterocyclic structure.

The monomer B includes at least one alicyclic structure.

The alicyclic structure may be, for example, a monocyclic structure, a fused-ring structure, a bridged-ring structure, or a spiro-ring structure.

The number of carbon atoms of the alicyclic structure is preferably 3 to 20, preferably 6 to 20, more preferably 6 to 12.

The monomer B preferably includes, as a radical-polymerizable group, a vinyl group, an allyl group, or a (meth)acryloyl group, more preferably includes a (meth)acryloyl group.

The monomer B is preferably a monofunctional or bifunctional radical-polymerizable monomer, more preferably a monofunctional radical-polymerizable monomer.

Here, the monofunctional radical-polymerizable monomer means a radical-polymerizable monomer including one radical-polymerizable group, and the bifunctional radical-polymerizable monomer means a radical-polymerizable monomer including two radical-polymerizable groups.

The molecular weight of the monomer B is preferably 1000 or less, more preferably 500 or less, still more preferably 300 or less.

Examples of the monomer B include
cyclohexyl(meth)acrylate,
isobornyl(meth)acrylate,
2-methyladamantan-2-yl(meth)acrylate,
2-ethyladamantan-2-yl(meth)acrylate,
3-hydroxy-1-(meth)acryloyloxyadamantane,
dicyclopentanyl(meth)acrylate,
dicyclopentanyloxyethyl(meth)acrylate,
dicyclopentenyl(meth)acrylate, and
dicyclopentenyloxyethyl(meth)acrylate.

The content of the monomer B is not particularly limited.

The content of the monomer B relative to the total amount of the ink is preferably 10 mass % to 50 mass %, more preferably 20 mass % to 40 mass %.

When the content of the monomer B relative to the total amount of the ink is 10 mass % or more, surface stickiness suppressibility (i.e., the ability to suppress the surface stickiness of a recorded image) and curability are further improved.

When the content of the monomer B relative to the total amount of the ink is 50 mass % or less, ejectability is further improved.

The content of the monomer B relative to the total content of all radical-polymerizable monomers contained in the ink is preferably 10 mass % to 60 mass %, more preferably 20 mass % to 50 mass %.

When the content of the monomer B relative to the total content of all radical-polymerizable monomers contained in the ink is 10 mass % or more, surface stickiness suppressibility and curability are further improved.

When the content of the monomer B relative to the total content of all radical-polymerizable monomers contained in the ink is 60 mass % or less, ejectability is further improved.

The content of the monomer B relative to the total content of the monomer A, the monomer B, and the monomer C is preferably 10 mass % to 60 mass %, more preferably 20 mass % to 50 mass %.

When the content of the monomer B relative to the total content of the monomer A, the monomer B, and the monomer C is 10 mass % or more, surface stickiness suppressibility and curability are further improved.

When the content of the monomer B relative to the total content of the monomer A, the monomer B, and the monomer C is 60 mass % or less, ejectability is further improved.

The total content of the monomer A and the monomer B relative to the total amount of the ink is preferably 35 mass % or more, more preferably 40 mass % or more, still more preferably 50 mass % or more.

When the total content of the monomer A and the monomer B relative to the total amount of the ink is 35 mass % or more, surface stickiness suppressibility and curability are further improved.

The upper limit of the total content of the monomer A and the monomer B relative to the total amount of the ink is not particularly limited. From the viewpoint of ejectability, the upper limit is preferably 80 mass %, more preferably 70 mass %.

The total content of the monomer A and the monomer B relative to the total content of all radical-polymerizable monomers contained in the ink is preferably 45 mass % or more, more preferably 50 mass % or more, still more preferably 55 mass % or more.

When the total content of the monomer A and the monomer B relative to the total content of all radical-polymerizable monomers contained in the ink is 45 mass % or more, surface stickiness suppressibility and curability are further improved.

The upper limit of the total content of the monomer A and the monomer B relative to the total content of all radical-polymerizable monomers contained in the ink is not particularly limited. From the viewpoint of ejectability, the upper limit is preferably 80 mass %, more preferably 70 mass %.

The total content of the monomer A and the monomer B relative to the total content of the monomer A, the monomer B, and the monomer C is preferably 45 mass % or more, more preferably 50 mass % or more, still more preferably 55 mass % or more.

When the total content of the monomer A and the monomer B relative to the total content of the monomer A, the monomer B, and the monomer C is 45 mass % or more, surface stickiness suppressibility and curability are further improved.

The upper limit of the total content of the monomer A and the monomer B relative to the total content of the monomer A, the monomer B, and the monomer C is not particularly limited. From the viewpoint of ejectability, the upper limit is preferably 80 mass %, more preferably 70 mass %.

Monomer C

The ink of the present disclosure contains at least one monomer C that is a radical-polymerizable monomer including a heterocyclic structure.

The monomer C includes at least one heterocyclic structure.

The heteroatom included in the heterocyclic structure is preferably an oxygen atom, a sulfur atom, or a nitrogen atom, more preferably an oxygen atom or a nitrogen atom, still more preferably an oxygen atom.

The number of heteroatoms included in one heterocyclic structure is preferably 1 to 3, more preferably 1 or 2.

The number of carbon atoms included in one heterocyclic structure is preferably 3 to 20, more preferably 3 to 12, still more preferably 3 to 5.

The heterocyclic structure may be, for example, a monocyclic structure, a fused-ring structure, a bridged-ring structure, or a spiro-ring structure.

These fused-ring structure, bridged-ring structure, and spiro-ring structure may each include a hetero ring, an aliphatic ring, and/or an aromatic ring.

The heterocyclic structure is preferably a five- or six-membered mono-heterocyclic structure.

The monomer C includes at least one heterocyclic structure, and may further include at least one alicyclic structure.

Examples and preferred embodiments of the alicyclic structure that can be included in the monomer C are respectively the same as the examples and the preferred embodiments described above of the alicyclic structure included in the monomer B.

The monomer C preferably includes, as a radical-polymerizable group, a vinyl group, an allyl group, or a (meth) acryloyl group, more preferably includes a (meth)acryloyl group.

The monomer C is preferably a monofunctional or bifunctional radical-polymerizable monomer, more preferably a monofunctional radical-polymerizable monomer.

Here, the monofunctional radical-polymerizable monomer means a radical-polymerizable monomer including one radical-polymerizable group, and the bifunctional radical-polymerizable monomer means a radical-polymerizable monomer including two radical-polymerizable groups.

The molecular weight of the monomer C is preferably 1000 or less, more preferably 500 or less, still more preferably 300 or less.

Examples of the monomer C include
cyclic trimethylolpropane formal (meth)acrylate,
(meth)acryloylmorpholine,
(2-methyl-2-ethyl-1,3-dioxolan-4-yl)methyl(meth)acrylate,
tetrahydrofurfuryl(meth)acrylate,
alkoxylated tetrahydrofurfuryl(meth)acrylate,
tetramethylpiperidyl(meth)acrylate, and
pentamethylpiperidyl(meth)acrylate.

The content of the monomer C is not particularly limited.

The content of the monomer C relative to the total amount of the ink is preferably 10 mass % to 50 mass %, more preferably 20 mass % to 40 mass %.

When the content of the monomer C relative to the total amount of the ink is 10 mass % or more, ejectability is further improved.

When the content of the monomer C relative to the total amount of the ink is 50 mass % or less, surface stickiness suppressibility is further improved.

The content of the monomer C relative to the total content of all radical-polymerizable monomers contained in the ink is preferably 10 mass % to 60 mass %, more preferably 20 mass % to 50 mass %.

When the content of the monomer C relative to the total content of all radical-polymerizable monomers contained in the ink is 10 mass % or more, ejectability is further improved.

When the content of the monomer C relative to the total content of all radical-polymerizable monomers contained in the ink is 60 mass % or less, surface stickiness suppressibility is further improved.

The content of the monomer C relative to the total content of the monomer A, the monomer B, and the monomer C is preferably 10 mass % to 60 mass %, more preferably 20 mass % to 50 mass %.

When the content of the monomer C relative to the total content of the monomer A, the monomer B, and the monomer C is 10 mass % or more, ejectability is further improved.

When the content of the monomer C relative to the total content of the monomer A, the monomer B, and the monomer C is 60 mass % or less, surface stickiness suppressibility is further improved.

In the ink of the present disclosure, the total content of the monomer A, the monomer B, and the monomer C is 60 mass % or more relative to the total amount of the ink.

This can improve curability and ejectability.

The total content of the monomer A, the monomer B, and the monomer C relative to the total amount of the ink is preferably 65 mass % or more.

The upper limit of the total content of the monomer A, the monomer B, and the monomer C relative to the total amount of the ink is not particularly limited.

The upper limit of the total content of the monomer A, the monomer B, and the monomer C relative to the total amount of the ink may be, for example, 95 mass % or 90 mass %.

To more effectively produce the effects of the ink of the present disclosure, the total content of the monomer A, the monomer B, and the monomer C relative to the total content of all radical-polymerizable monomers contained in the ink is preferably 70 mass % or more, more preferably 80 mass % or more.

The total content of the monomer A, the monomer B, and the monomer C relative to the total content of all radical-polymerizable monomers contained in the ink may be 100 mass %.

Other Radical-Polymerizable Monomer

The ink of the present disclosure may contain another radical-polymerizable monomer other than the monomers described above.

The other radical-polymerizable monomer may be a known radical-polymerizable monomer, and examples include (meth)acrylate compounds, (meth)acrylamide compounds, vinyl ether compounds, allyl compounds, N-vinyl compounds, and unsaturated carboxylic acids.

The other radical-polymerizable monomer may be, for example, a radical-polymerizable monomer described in JP2009-221414A, a radical-polymerizable compound described in JP2009-209289A, or an ethylenically unsaturated compound described in JP2009-191183A.

The other radical-polymerizable monomer is preferably a (meth)acrylate compound.

The molecular weight of the other radical-polymerizable monomer is preferably 80 to 1,000, more preferably 80 to 800, still more preferably 80 to 500.

The other radical-polymerizable monomer may be a monofunctional radical-polymerizable monomer or a bi- or higher functional radical-polymerizable monomer.

Specific examples of the other radical-polymerizable monomer include monofunctional (meth)acrylate compounds such as alkyl (meth)acrylate compounds having an alkyl group of 1 to 20 carbon atoms;

bifunctional (meth)acrylate compounds such as 1,6-hexanediol di(meth)acrylate, dipropylene glycol di(meth)acrylate, and propoxylated (2) neopentyl glycol diacrylate; and trifunctional (meth)acrylate compounds such as trimethylolpropane tri(meth)acrylate, tris(2-hydroxyethyl) isocyanurate tri(meth)acrylate, and ethylene oxide (EO) modified trimethylolpropane tri(meth)acrylate.

Examples of the other radical-polymerizable monomer also include unsaturated carboxylic acids such as acrylic acid, methacrylic acid, itaconic acid, crotonic acid, isocrotonic acid, and maleic acid and salts thereof, anhydrides having an ethylenically unsaturated group, acrylonitrile, styrene, and various unsaturated polyesters, unsaturated polyethers, unsaturated polyamides, and unsaturated urethanes.

More specifically, commercially available products described in, for example, "Crosslinking Agent Handbook" (1981, Taiseisha Ltd.) edited by Shinzo Yamashita; "UV/EB Curing Handbook (Raw Material)" (1985, Kobunshi Kankokai) edited by Kiyoshi Kato; "Application and Market of UV/EB Curing Technology" p. 79 (1989, CMC Publishing Co., Ltd.) edited by RadTech Japan; and "Polyester Resin Handbook" (1988, Nikkan Kogyo Shimbun, Ltd.) written by Eiichiro Takiyama, and radical-polymerizable monomers, oligomers, and polymers known in the art can be used.

The ink of the present disclosure may contain, as the other radical-polymerizable monomer, N-vinylcaprolactam, which is widely used in the field of photocurable inks.

However, the monomer A in the ink of in the present disclosure can serve as an alternative to N-vinylcaprolactam.

Thus, the ink of the present disclosure need not contain N-vinylcaprolactam. If the ink of the present disclosure contains N-vinylcaprolactam, the content of N-vinylcaprolactam may be reduced.

The content of N-vinylcaprolactam in the ink of the present disclosure relative to the total amount of the ink may be 10 mass % or less, 5 mass % or less, or 1 mass % or less.

In addition, the ink of the present disclosure may contain a tri- or higher functional radical-polymerizable monomer as the other radical-polymerizable monomer.

For example, from the viewpoint of ink ejectability, image flexibility, and image glossiness, the content of the tri- or higher functional radical-polymerizable monomer in the ink of the present disclosure relative to the total amount of the ink is preferably 15 mass % or less, more preferably 10 mass % or less, still more preferably 5 mass % or less, even more preferably 1 mass % or less, yet even more preferably 0 mass % (i.e., the ink of the present disclosure contains no tri- or higher functional radical-polymerizable monomers).

From the viewpoint of ink ejectability, in the ink of the present disclosure, the total content of the monofunctional radical-polymerizable monomers and the bifunctional radical-polymerizable monomers relative to the total amount of the ink is preferably 60 mass % or more, more preferably 65 mass % or more.

The upper limit of the total content of the monofunctional radical-polymerizable monomers and the bifunctional radical-polymerizable monomers is not particularly limited, and the upper limit may be, for example, 100 mass %, 95 mass %, or 90 mass %.

In the ink of the present disclosure, the proportion of the monofunctional radical-polymerizable monomers in all radical-polymerizable monomers contained in the ink is preferably 60 mass % or more, more preferably 65 mass % or more.

The upper limit of the proportion of the monofunctional radical-polymerizable monomers in all radical-polymerizable monomers contained in the ink is not particularly limited, and the upper limit may be, for example, 100 mass %, 95 mass %, or 90 mass %. Photopolymerization initiator The ink of the present disclosure preferably contains at least one photopolymerization initiator.

The photopolymerization initiator may be a known photopolymerization initiator that absorbs light (i.e., active radiation) to generate radicals serving as polymerization initiation species.

Examples of preferred photopolymerization initiators include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above compounds (a) to (m) may be used alone or in combination of two or more.

More preferred photopolymerization initiators are (a), (b), and (e) above.

Preferred examples of (a) carbonyl compounds, (b) acylphosphine oxide compounds, and (e) thio compounds include compounds having a benzophenone skeleton or a thioxanthone skeleton, as described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-547-3981B), α-substituted benzoin compounds described in JP1972-22326B (JP-S47-22326B), benzoin derivatives described in JP1972-23664B (JP-547-23664B), aroyl phosphonates described in JP1982-30704A (JP-S57-30704A), dialkoxybenzophenones described in JP1985-26483B (JP-560-26483B), benzoin ethers described in JP1985-26403B (JP-560-26403B) and JP1987-81345A (JP-562-81345A), α-aminobenzophenones described in JP1989-34242B (JP-H1-34242B), U54318791A, and EP0284561A1, p-di(dimethylaminobenzoyl)benzene described in JP1990-211452A (JP-H2-211452A), thio-substituted aromatic ketones described in JP1986-194062A (JP-561-194062A), acylphosphine sulfides described in JP1990-9597B (JP-H2-9597B), acylphosphines described in JP1990-9596B (JP-H2-9596B), thioxanthones described in JP1988-61950B (JP-563-61950B), and coumarins described in JP1984-42864B (JP-559-42864B).

Polymerization initiators described in in JP2008-105379A and JP2009-114290A are also preferred.

Of these photopolymerization initiators, (a) carbonyl compounds or (b) acylphosphine oxide compounds are more preferred. Specific examples include bis(2,4,6-trimethylbenzoyl)-phenylphosphine oxide (e.g., IRGACURE (registered trademark) 819 manufactured by BASF), 2-(dimethylamine)-1-(4-morpholinophenyl)-2-benzyl-1-butanone (e.g., IRGACURE (registered trademark) 369 manufactured by BASF), 2-methyl-1-(4-methylthiophenyl)-2-morpholinopropan-1-one (e.g., IRGACURE (registered trademark) 907 manufactured by BASF), 1-hydroxy-cyclohexyl-phenyl-ketone (e.g., IRGACURE (registered trademark) 184 manufactured by BASF), and 2,4,6-trimethylbenzoyl-diphenyl-phosphine oxide (e.g., DAROCUR (registered trademark) TPO and LUCIRIN (registered trademark) TPO (both manufactured by BASF)).

Of these, from the viewpoint of, for example, improvement of sensitivity and suitability for LED light, the photopolymerization initiator is preferably (b) an acylphosphine oxide compound, more preferably a monoacylphosphine oxide compound (particularly preferably, 2,4,6-trimethylbenzoyl-diphenyl-phosphine oxide) or a bisacylphosphine oxide compound (particularly preferably, bis(2,4,6-trimethylbenzoyl)-phenylphosphine oxide).

When the ink of the present disclosure contains a photopolymerization initiator, the content of the photopolymerization initiator relative to the total amount of the ink is preferably 1.0 mass % to 25.0 mass %, more preferably 2.0 mass % to 20.0 mass %, still more preferably 3.0 mass % to 15.0 mass %.
Sensitizer The ink of the present disclosure may contain at least one sensitizer.

Here, the sensitizer is a substance that absorbs a specific active radiation to enter an electronically excited state. The sensitizer in the electronically excited state comes in contact with the photopolymerization initiator to cause an action such as electron transfer, energy transfer, or heat generation. This promotes a chemical change of the photopolymerization initiator, specifically, for example, decomposition, or generation of radicals, acids, or bases.

Examples of the sensitizer include ethyl 4-(dimethylamino) benzoate (EDB), anthraquinone, 3-acylcoumarin derivatives, terphenyl, styryl ketone, 3-(aroylmethylene)thiazoline, camphorquinone, eosin, rhodamine, and erythrosine.

As the sensitizer, a compound represented by general formula (i) described in JP2010-24276A and a compound represented by general formula (I) described in JP1994-107718A (JP-H6-107718A) are also suitable for use.

Among the above, the sensitizer is preferably at least one selected from thioxanthone, isopropylthioxanthone, ethyl 4-(dimethylamino) benzoate, and benzophenone, from the viewpoint of suitability for LED light and reactivity with photopolymerization initiators.

When the ink of the present disclosure contains a sensitizer, the content of the sensitizer is preferably 0.5 mass % to 10 mass %, more preferably 1.0 mass % to 7.0 mass %, particularly preferably 2.0 mass % to 6.0 mass %.
Surfactant The ink of the present disclosure may contain at least one surfactant.

Examples of the surfactant include surfactants described in JP1987-173463A (JP-S62-173463A) and JP1987-183457A (JP-S62-183457A). Examples include anionic surfactants such as dialkyl sulfosuccinates, alkylnaphthalene sulfonates, and fatty acid salts; nonionic surfactants such as polyoxyethylene alkyl ethers, polyoxyethylene alkyl allyl ethers, acetylene glycol, polyoxyethylene-polyoxypropylene block copolymers, and silicones such as modified polydimethylsiloxane; cationic surfactants such as alkylamine salts and quarternary ammonium salts; and betaine surfactants such as carbobetaine and sulfobetaine.

An organofluorine compound including no polymerizable groups may be used instead of the surfactant. The organofluorine compound is preferably hydrophobic. The organofluorine compound includes, for example, fluorine-containing surfactants, oily fluorine-containing compounds (e.g., fluorine oil), and solid fluorine compound resins (e.g., tetrafluoroethylene resins), and examples include compounds described in JP1982-9053B (JP-S57-9053B) (the 8th to 17th columns) and JP1987-135826A (JP-S62-135826A).

When the ink of the present disclosure contains a surfactant, the content of the surfactant relative to the total amount of the ink is preferably 0.001 mass % to 5.0 mass %, more preferably 0.05 mass % to 3.0 mass %, particularly preferably 0.05 mass % to 2.0 mass %.

Polymerization Inhibitor

The ink of the present disclosure may contain at least one polymerization inhibitor.

Examples of the polymerization inhibitor include p-methoxyphenol, quinones (e.g., hydroquinone, benzoquinone, and methoxybenzoquinone), phenothiazine, catechols, alkylphenols (e.g., dibutylhydroxytoluene (BHT)), alkyl bisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine)aluminum salt (also known as cupferron Al).

Of these, at least one selected from the group consisting of p-methoxyphenol, catechols, quinones, alkylphenols, TEMPO, TEMPOL, and tris(N-nitroso-N-phenylhydroxylamine) aluminum salt is preferred, and at least one selected from the group consisting of p-methoxyphenol, hydroquinone, benzoquinone, BHT, TEMPO, TEMPOL, and tris(N-nitroso-N-phenylhydroxylamine)aluminum salt is more preferred.

When the ink of the present disclosure contains a polymerization inhibitor, the content of the polymerization inhibitor relative to the total amount of the ink is preferably 0.01 mass % to 2.0 mass %, more preferably 0.02 mass % to 1.0 mass %, particularly preferably 0.03 mass % to 0.5 mass %.

Resin

The ink of the present disclosure may contain at least one resin.

The resin is preferably a resin including no polymerizable groups.

Examples of the resin include epoxy resins, vinyl chloride resins, vinyl acetate resins, polyesters, (meth)acrylic resins, chlorinated polyolefins, and polyketones.

Examples of commercially available vinyl chloride resins include UCAR solution vinyl resins VYHD, VYHH, VMCA, VROH, and VYLF-X manufactured by The Dow Chemical Company; SOLBIN resins CL, CNL, CSR, and TA5R manufactured by Nissin Chemical Co., Ltd.; and VINNOL (registered trademark) E15/40, E15/45, H14/36, H15/42, H15/50, H11/59, H40/43, H40/50, H40/55, H40/60, H15/45M, E15/45M, and E15/40A manufactured by Wacker.

Examples of (meth)acrylic resins include copolymers of methyl methacrylate and n-butyl methacrylate.

Examples of commercially available (meth)acrylic resins include Elvacite 2013 (copolymer of methyl methacrylate and n-butyl methacrylate, Mw=34,000), Elvacite 2014 (copolymer of methyl methacrylate and n-butyl methacrylate, Mw=119,000), and Elvacite 4099 (copolymer of methyl methacrylate and n-butyl methacrylate, Mw=15,000) manufactured by Lucite International; and DIANAL (registered trademark) BR-113 (butyl methacrylate resin, Mw=30,000) manufactured by Mitsubishi Chemical Corporation.

A resin described as a "specific resin" in International Publication No. 2017/033984 may be used as a (meth) acrylic resin.

Examples of commercially available polyesters include polyester resins ("TEGO (registered trademark) AddBond LTH"; Mw=3,000) manufactured by Evonik Japan Co., Ltd.

Examples of commercially available chlorinated polyolefins include SUPERCHLON (registered trademark) 814HS manufactured by Nippon Paper Industries Co., Ltd.

Examples of commercially available polyketones include TEGO (registered trademark) VARIPLUS AP, CA, and SK manufactured by Evonik.

The weight-average molecular weight (Mw) of the resin is preferably 3,000 to 200,000, more preferably 5,000 to 200,000, still more preferably 10,000 to 150,000, even more preferably 10,000 to 100,000, particularly preferably 10,000 to 50,000.

In the present disclosure, weight-average molecular weights (Mw) are values measured by gel permeation chromatography (GPC).

In the measurement using gel permeation chromatography (GPC), an HLC-8020GPC (registered trademark) (Tosoh Corporation) measuring apparatus, three TSKgel (registered trademark) Super Multipore HZ-H (4.6 mm ID×15 cm, Tosoh Corporation) columns, and tetrahydrofuran (THF) as an eluent are used. The measurement is performed using an RI detector under the following conditions: sample concentration, 0.45 mass %; flow rate, 0.35 ml/min; sample injection volume, 10 μL; measurement temperature, 40° C.

Eight Tosoh TSK standard polystyrene samples: "F-40", "F-20", "F-4", "F-1", "A-5000", "A-2500", "A-1000", and "n-propylbenzene" are used to construct a calibration curve.

When the ink includes a resin, the content of the resin relative to the total amount of the ink is preferably 1 mass % to 10 mass %, more preferably 1.5 mass % to 10 mass %, particularly preferably 2 mass % to 6 mass %.

Water

The ink of the present disclosure may contain a small amount of water.

Specifically, the content of water relative to the total amount of the ink of the present disclosure is preferably 3 mass % or less, more preferably 2 mass % or less, particularly preferably 1 mass % or less.

The ink of the present disclosure is preferably a non-aqueous ink containing substantially no water.

Colorant

The ink of the present disclosure may contain at least one colorant.

The colorant is not particularly limited and may be freely selected from known color materials such as pigments, water-soluble dyes, and disperse dyes. Of these, pigments, which have high weather resistance and high color reproducibility, are more preferred.

The pigments are not particularly limited and can be appropriately selected according to the purpose. Examples include known organic pigments and inorganic pigments and further include resin particles dyed with dyestuff, and commercially available pigment dispersions and surface-treated pigments [such as dispersions of pigments in dispersion media (e.g., radical-polymerizable monomers and organic solvents) and pigments surface-treated with resins or pigment derivatives].

Examples of the organic pigments and the inorganic pigments include yellow pigments, red pigments, magenta pigments, blue pigments, cyan pigments, green pigments, orange pigments, violet pigments, brown pigments, black pigments, and white pigments.

When the ink of the present disclosure contains a pigment as the colorant, the ink may contain a dispersing agent as required.

Regarding the colorants, such as pigments, and the dispersing agents, reference can be made, as appropriate, to known publications such as paragraphs 0152 to 0158 of JP2011-225848A and paragraphs 0132 to 0149 of JP2009-209352A.

When the ink of the present disclosure contains a colorant, the content of the colorant relative to the total amount of the ink is preferably 0.1 mass % to 20 mass %, more preferably 0.5 mass % to 10 mass %.

The ink of the present disclosure may also be an ink including substantially no colorant (what is called a clear ink).

Here, including substantially no colorant means that the content of the colorant is less than 0.1 mass % relative to the total amount of the ink.

Other Components

The ink of the present disclosure may contain other components other than the above.

Examples of the other components include UV absorbers, co-sensitizers, antioxidants, anti-fading agents, and electro-conductive salts.

Regarding the other components, reference can be made, as appropriate, to known publications such as JP2011-225848A and JP2009-209352A.

Preferred Physical Properties of Ink

The viscosity of the ink of the present disclosure is not particularly limited.

The viscosity at 25° C. of the ink of the present disclosure is preferably 10 mPa·s to 50 mPa·s, more preferably 10 mPa·s to 30 mPa·s, still more preferably 10 mPa·s to 25 mPa·s. The viscosity of the ink can be adjusted, for example, by adjusting the composition ratio of contained components.

Herein, the viscosity is a value measured using a viscometer: VISCOMETER RE-85L (manufactured by Toki Sangyo Co., Ltd.).

When the viscosity of the ink is within the above preferred range, ejectability can be further improved.

The surface tension of the ink of the present disclosure is not particularly limited.

The surface tension at 30° C. of the ink of the present disclosure is preferably 20 mN/m to 30 mN/m, more preferably 23 mN/m to 28 mN/m. When an image is recorded on a substrate such as a polyolefin, PET, coated paper, or uncoated paper, the surface tension is preferably 30 mN/m or less in terms of wettability, and is preferably 20 mN/m or more in terms of permeability and prevention of bleeding.

Herein, the surface tension is a value measured using a DY-700 surface tensiometer (manufactured by Kyowa Interface Science Co., Ltd.).

Image Recording Method

An image recording method of the present disclosure has a step of applying the ink of the present disclosure to a substrate by an ink jet method (hereinafter also referred to as an "application step") and a step of irradiating the ink applied to the substrate with an active radiation (i.e., "light" in the present disclosure) (hereinafter also referred to as an "irradiation step").

Substrate

The substrate is not particularly limited, and, for example, a substrate known as a support or recording material can be used.

Examples of the substrate include paper, paper laminated with plastics (e.g., polyethylene, polypropylene, and polystyrene), metal plates (e.g., plates of metals such as aluminum, zinc, and copper), plastic films (e.g., films of polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, and acrylic resin), paper laminated or deposited with the foregoing metals, and plastic films laminated or deposited with the foregoing metals.

The ink of the present disclosure enables recording of an image with high adhesion to a substrate and thus is particularly suitable for applications where an image is recorded on a non-absorbable substrate.

Here, being non-absorbable means that the amount of water absorption is 0.3 $g/m^2$ or less.

The amount ($g/m^2$) of water absorption of a substrate is measured as described below. Water is brought into contact with an area of 100 mm×100 mm on the front surface (i.e., the surface on which an image is to be formed) of the substrate, and this state is held for one minute at 25° C. The mass (absorbed amount (g)) of water absorbed during this one-minute holding is determined, and the absorbed amount (g) obtained is converted into an absorbed amount ($g/m^2$) per unit area.

The non-absorbable substrate is preferably a plastic substrate such as a polyvinyl chloride (PVC) substrate, a polystyrene (PS) substrate, a polycarbonate (PC) substrate, a polyethylene terephthalate (PET) substrate, a polypropylene (PP) substrate, or an acrylic resin substrate.

Application Step

The application step is a step of applying the ink of the present disclosure to a substrate by an ink jet method.

The application of the ink by an ink jet method can be performed using a known ink jet recording apparatus.

The ink jet recording apparatus is not particularly limited, and a known ink jet recording apparatus that can achieve a desired resolution can be freely selected and used. That is, known ink jet recording apparatuses including commercially available products can be used.

The ink jet recording apparatus may be, for example, an apparatus including an ink supply system, a temperature sensor, and heating means.

The ink supply system is constituted by, for example, a source tank including an ink, a supply pipe, an ink supply tank disposed immediately upstream of an ink jet head, a filter, and a piezoelectric ink jet head. The piezoelectric ink jet head can be driven so as to eject multi-size dots of preferably 1 pL to 100 pL, more preferably 8 pL to 30 pL, at a resolution of preferably 320 dpi (dot per inch)×320 dpi to 4000 dpi×4000 dpi (dot per inch), more preferably 400 dpi×400 dpi to 1600 dpi×1600 dpi, still more preferably 720 dpi×720 dpi to 1600 dpi×1600 dpi.

The term "dpi" represents the number of dots per 2.54 cm (1 inch).

Irradiation Step

The irradiation step is a step of irradiating the ink applied to the substrate with an active radiation.

By irradiating the ink applied to the substrate with an active radiation, the polymerization reaction of radical-polymerizable monomers in the ink is allowed to proceed. This can fix an image and improve, for example, the hardness of the image.

Examples of active radiations that can be used in the irradiation step include ultraviolet radiation (UV light), visible radiation, and electron beams. Of these, UV light is preferred.

The peak wavelength of the active radiation is preferably 200 nm to 405 nm, more preferably 220 nm to 390 nm, still more preferably 220 nm to 385 nm.

A peak wavelength of 200 nm to 310 nm is also preferred, and a peak wavelength of 200 nm to 280 nm is also preferred.

The exposure energy during the irradiation with an active radiation is, for example, 10 mJ/cm$^2$ to 2000 mJ/cm$^2$, preferably 20 mJ/cm$^2$ to 1000 mJ/cm$^2$.

As sources for generating active radiations, mercury lamps, metal halide lamps, UV fluorescent lamps, gas lasers, solid-state lasers, and the like are widely known.

Replacement of these light sources listed as examples with semiconductor ultraviolet emission devices is very beneficial from industrial and environmental standpoints.

Among the semiconductor ultraviolet emission devices, LEDs (light emitting diodes) and LDs (laser diodes), which have small sizes and long operating lives and are highly efficient and inexpensive, hold promise as light sources.

Preferred light sources are metal halide lamps, extra-high-pressure mercury lamps, high-pressure mercury lamps, medium-pressure mercury lamps, low-pressure mercury lamps, LEDs, and blue-violet lasers.

Of these, in the case where a sensitizer and a photopolymerization initiator are used in combination, an extra-high-pressure mercury lamp capable of applying light having a wavelength of 365 nm, 405 nm, or 436 nm, a high-pressure mercury lamp capable of applying light having a wavelength of 365 nm, 405 nm, or 436 nm, or an LED capable of applying light having a wavelength of 355 nm, 365 nm, 385 nm, 395 nm, or 405 nm is more preferred, and an LED capable of applying light having a wavelength of 355 nm, 365 nm, 385 nm, 395 nm, or 405 nm is most preferred.

In the irradiation step, the time during which the ink applied to the substrate is irradiated with an active radiation is, for example, 0.01 seconds to 120 seconds, preferably 0.1 seconds to 90 seconds.

Regarding irradiation conditions and a basic irradiation method, the irradiation conditions and irradiation method disclosed in JP1982-132767A (JP-S60-132767A) can be applied in a similar manner.

Specifically, the irradiation with an active radiation is preferably performed by a method in which light sources are disposed on both sides of a head unit including an ink ejection device, and the head unit and the light sources are scanned in what is called a shuttle mode; or a method in which the irradiation with an active radiation is performed using another light source that is not driven.

The irradiation with an active radiation is preferably performed after a certain period of time (e.g., 0.01 seconds to 120 seconds, preferably 0.01 seconds to 60 seconds) from landing and heat-drying of the ink.

Heat Drying Step

The image recording method may optionally further include a heat drying step after the application step and before the irradiation step.

Examples of heating means include, but are not limited to, heat drums, hot air, infrared lamps, hot ovens, and heating plates.

The heating temperature is preferably 40° C. or higher, more preferably about 40° C. to 150° C., still more preferably about 40° C. to 80° C.

The heating time can be appropriately set taking into account the composition of the ink and the printing speed.

Image Recorded Article

An image recorded article of the present disclosure includes a substrate and an image disposed on the substrate, the image being a cured product of the ink of the present disclosure.

The image recorded article of the present disclosure can be produced using the ink of the present disclosure having high curability and high ejectability.

The image of the image recorded article produced is less likely to suffer stickiness of the surface in a high-temperature environment (e.g., an environment at 40° C.).

In the image recorded article of the present disclosure, the image that is a cured product of the ink of the present disclosure preferably contains a copolymer including a structural unit derived from the monomer A, a structural unit derived from the monomer B, and a structural unit derived from the monomer C, the total content of the structural unit derived from the monomer A, the structural unit derived from the monomer B, and the structural unit derived from the monomer C being 60 mass % or more relative to the total amount of the copolymer.

Here, the structural unit derived from the monomer A, the structural unit derived from the monomer B, and the structural unit derived from the monomer C mean a structural unit resulting from radical polymerization of the monomer A, a structural unit resulting from radical polymerization of the monomer B, and a structural unit resulting from radical polymerization the monomer C, respectively.

Regarding a preferred range of the content ratio of these structural units in the copolymer, reference can be made, as appropriate, to the section of the ink described above.

The copolymer may contain another structural unit other than the structural units described above.

The image may contain other components other than the copolymer.

Regarding the other structural unit and the other components, reference can be made, as appropriate, to the section of the ink described above.

EXAMPLES

Examples of the present disclosure will now be described, but the present disclosure is not limited to the following Examples.

Example 1

Preparation of Cyan Pigment Dispersion

Raw materials in the following composition were mixed together and stirred using a mixer (L4R manufactured by Silverson) at 2,500 revolutions/min for 10 minutes to obtain a mixture. The mixture obtained was then placed in a DISPERMAT LS bead mill disperser (manufactured by VMA GETZMANN GMBH) and dispersed using YTZ balls (manufactured by Nikkato Corporation) having a diameter of 0.65 mm at 2,500 revolutions/min for 6 hours to prepare a cyan pigment dispersion (hereinafter referred to as a C pigment dispersion).

Composition of C Pigment Dispersion
  IRGALITE BLUE GLVO (cyan pigment) manufactured by BASF
    40 parts by mass
  SOLSPERSE 32000 (high molecular weight dispersant) manufactured by The Lubrizol Corporation
    10 parts by mass SR9003 (bifunctional monomer, propoxylated (2) neopentyl glycol diacrylate) manufactured by Sartomer
  59 parts by mass
Firstcure ST-1 (polymerization inhibitor; tris(N-nitroso-N-phenylhydroxylamine) aluminum salt) manufactured by Albemarle Corporation
  1 part by mass Preparation of Ink Components in the following composition were mixed together to prepare an ink.

Ink of Composition

C pigment dispersion
  7 parts by mass
N-vinyloxazolidinone (hereinafter also referred to as "NVO") (monomer A)
  12 parts by mass
Isobornyl acrylate (hereinafter also referred to as "IBOA") (monomer B)
  38 parts by mass
Cyclic trimethylolpropane formal acrylate (hereinafter also referred to as "CTFA") (monomer C)
  28 parts by mass
Firstcure ST-1 (hereinafter also referred to as "ST-1") (polymerization inhibitor) manufactured by Albemarle Corporation
  1.1 parts by mass
IRGACURE184 (hereinafter also referred to as "IRG184") (photopolymerization initiator; carbonyl compound (specifically, 1-hydroxy-cyclohexyl-phenyl-ketone)) manufactured by BASF
  2.4 parts by mass
IRGACURE819 (hereinafter also referred to as "IRG819") (photopolymerization initiator; acylphosphine oxide compound (specifically, bis(2,4,6-trimethylbenzoyl)-phenylphosphine oxide)) manufactured by BASF
  8.2 parts by mass
SPEEDCURE BP (hereinafter also referred to as "BP") (photopolymerization initiator; benzophenone) manufactured by Lambson
  3.2 parts by mass
BYK-307 (hereinafter also referred to as "BYK307") (silicone surfactant) manufactured by BYK-Chemie
  0.1 parts by mass Image Recording An ink jet recording apparatus including an ink jet head and a curing light source was provided.

As the ink jet head, a Q-class Sapphire QS-256/10 piezoelectric ink jet head (manufactured by FUJIFILM DIMATIX, the number of nozzles, 256; minimum droplet amount, 10 pL; 50 kHz) was used.

As the curing light source, a curing light source including left and right (two) light sources in each of which ten light-emitting diodes (UV-LED, NC4U134 manufactured by Nichia Corporation; peak wavelength, 385 nm) were arranged was used. The illuminance per light source was 1,500 mW/cm$^2$.

Using the ink jet recording apparatus, the ink was ejected through the ink jet head, thereby applying the ink to a substrate. The temperature of the ink ejected through the ink jet head was set to 45° C.

The ink applied to the substrate was irradiated with UV light from the curing light source, thereby curing the ink. The energy (exposure energy) of the UV light for irradiation was set to 400 mJ/cm$^2$.

In this manner, an image, i.e., a cured film of the ink, was recorded on the substrate. Hereinafter, a substrate on which an image is recorded is also referred to as an image recorded article.

Evaluations

The following evaluations were conducted.

The results are shown in Table 1.

Curability

In accordance with the above image recording, a solid image, i.e., a cured film of the ink, with an average thickness of 10 μm was recorded on a polyethylene terephthalate (PET) substrate ("Viewful UV TP-188" manufactured by Kimoto Co., Ltd., hereinafter the same) to obtain an image recorded article.

On the solid image of the image recorded article obtained, the above PET substrate serving as a transfer substrate was placed within 10 minutes from the completion of recording of the solid image (i.e., the completion of UV light irradiation), to exert a load of 1 kg/A6 size. In this state, the image recorded article and the transfer substrate were left to stand in an environment at 40° C. for one day.

After the passage of one day, the transfer substrate was peeled off the solid image of the image recorded article, and the area of image transferred from the solid image to the transfer substrate side was checked. A transfer area was determined by the following formula.

Transfer area (%)=(area of image transferred to transfer substrate side/area of contact between transfer substrate and solid image)×100

On the basis of the results obtained, curability was evaluated according to the following evaluation criteria.

In the following evaluation criteria, the rank indicating highest curability is "A". Evaluation criteria for curability
  A: The transfer area is less than 1%.
  B: The transfer area is 1% or more and less than 25%.
  C: The transfer area is 25% or more and less than 50%.
  D: The transfer area is 50% or more and less than 75%.
  E: The transfer area is 75% or more.

Surface Stickiness Suppressibility

In accordance with the above image recording, a solid image with an average thickness of 10 μm was recorded on the above PET substrate to obtain an image recorded article.

The image recorded article obtained was left to stand in an environment at 40° C. for one day.

The solid image of the image recorded article after the passage of one day was subjected to an operation of wiping with Kimwipes. During this wiping operation, the sticky feeling of the surface of the image was checked, and after the wiping operation, the trace of wiping with Kimwipes on the surface of the image was checked. Surface stickiness suppressibility was evaluated according to the following evaluation criteria.

In the following evaluation criteria, the rank indicating that the surface stickiness of an image is most effectively suppressed (i.e., the rank indicating highest surface stickiness suppressibility) is "A".

Evaluation Criteria for Surface Stickiness Suppressibility
  A: There is no sticky feeling on the surface of an image, and no wiping trace is visually observed on the surface of the image.
  B: There is a slight sticky feeling on the surface of an image, but no wiping trace is visually observed on the surface of the image.
  C: There is a slight sticky feeling on the surface of an image, and a slight wiping trace is visually observed on the surface of the image.

D: There is a sticky feeling on the surface of an image, and a slight wiping trace is visually observed on the surface of the image.

E: There is a sticky feeling on the surface of an image, and a wiping trace is visually observed on the surface of the image.

Ejectability

Ejection of the ink through the ink jet head of the ink jet recording apparatus was started, and then the ejection was stopped once. After 10 minutes passed in this state, the ejection of the ink was started again, and a solid image with an average thickness of 10 was recorded on the above PET substrate in accordance with the above image recording to obtain an image recorded article.

The solid image of the image recorded article was observed to check if there was a nozzle failure. On the basis of the results of checking, ejectability was evaluated according to the following evaluation criteria.

In the following evaluation criteria, the rank indicating highest ejectability is "A".

Evaluation Criteria for Ejectability

A: No nozzle failures are observed.
B: One or two nozzle failures are observed.
C: Three to five nozzle failures are observed.
D: Six to nine nozzle failures are observed.
E: Ten or more nozzle failures are observed.

Examples 2 to 19 and Comparative Examples 1 to 5

The same operation as in Example 1 was performed except that the composition of the ink was replaced with a composition shown in Table 1 or Table 2.

The results are shown in Table 1 or Table 2.

In Example 13, a polymer 1 below as a resin was incorporated into the ink. In the polymer 1, indices shown at the lower right of structural units each denote a copolymerization mass ratio.

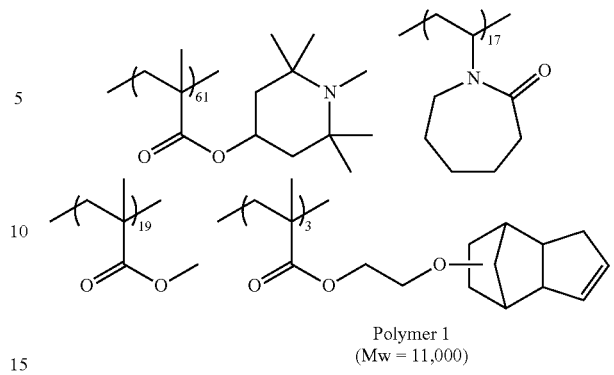

Polymer 1
(Mw = 11,000)

The polymer 1 was synthesized in the following manner.

Into a 1000 mL three-necked flask equipped with a condenser, 161.22 g of 1-propanol (reaction solvent) and 42.50 g of N-vinylcaprolactam (starting monomer) were weighed, and stirring was performed with heating at 75° C. under a stream of nitrogen.

Separately from this, a mixed solution prepared by mixing 103.85 g of 1-propanol, 152.50 g of pentamethylpiperidyl methacrylate (starting monomer), 47.51 g of methyl methacrylate (starting monomer), 7.52 g of dicyclopentenyloxyethyl methacrylate (starting monomer), 13.33 g of V-601 (initiator), and 7.03 g of dodecyl mercaptan was added dropwise into the above flask over 4 hours. After completion of the dropwise addition, the resulting mixture was heated at 75° C. for 1 hour and then stirred at 90° C. for 3 hours to cause a reaction.

The resulting reaction solution was allowed to cool, and the reaction solution after being allowed to cool was poured into a mixed solution of 2047.93 g of water and 47.92 g of methanol in an ice bath. The resulting mixture was purified by reprecipitation and then dried under vacuum.

In the above manner, about 241 g of the polymer 1 (weight-average molecular weight (Mw): 11,000) was obtained.

TABLE 1

| | | Example 1 | Example 2 | Example 3 | Example 4 | Example 5 | Example 6 | Example 7 |
|---|---|---|---|---|---|---|---|---|
| C pigment dispersion | | 7 | 7 | 7 | 7 | 7 | 7 | 7 |
| Monomer A | NVO | 12 | 12 | 8 | 24 | 31 | 30 | 12 |
| | NVMO | | | | | | | |
| Monomer B | IBOA | 38 | 34 | 36 | 22 | 24 | 12 | 42 |
| | CHA | | | | | | | |
| Monomer C | CTFA | 28 | 32 | 34 | 32 | 23 | 36 | 24 |
| | ACMO | | | | | | | |
| | MEDOL10 | | | | | | | |
| Other monomer | LA | | | | | | | |
| | TMPTA | | | | | | | |
| Polymerization inhibitor | ST-1 | 1.1 | 1.1 | 1.1 | 1.1 | 1.1 | 1.1 | 1.1 |
| Photopolymerization initiator | IRG184 | 2.4 | 2.4 | 2.4 | 2.4 | 2.4 | 2.4 | 2.4 |
| | IRG819 | 8.2 | 8.2 | 8.2 | 8.2 | 8.2 | 8.2 | 8.2 |
| | BP | 3.2 | 3.2 | 3.2 | 3.2 | 3.2 | 3.2 | 3.2 |
| Resin | Polymer 1 | | | | | | | |
| Surfactant | BYK307 | 0.1 | 0.1 | 0.1 | 0.1 | 0.1 | 0.1 | 0.1 |
| Total | | 100.0 | 100.0 | 100.0 | 100.0 | 100.0 | 100.0 | 100.0 |
| A + B | | 50.0 | 46.0 | 44.0 | 46.0 | 55.0 | 42.0 | 54.0 |
| A + B + C | | 78.0 | 78.0 | 78.0 | 78.0 | 78.0 | 78.0 | 78.0 |
| A/all monomers | | 14.6 | 14.6 | 9.7 | 29.2 | 37.7 | 36.5 | 14.6 |

TABLE 1-continued

| | | | | | | | | |
|---|---|---|---|---|---|---|---|---|
| Evaluation results | Curability | B | B | C | A | C | A | B |
| | Surface stickiness suppressibility | A | A | A | A | B | B | A |
| | Ejectability | B | B | B | A | B | A | B |

| | | Example 8 | Example 9 | Example 10 | Example 11 | Example 12 | Example 13 |
|---|---|---|---|---|---|---|---|
| C pigment dispersion | | 7 | 7 | 7 | 7 | 7 | 7 |
| Monomer A | NVO | 30 | 16 | 24 | 24 | 24 | 24 |
| | NVMO | | | | | | |
| Monomer B | IBOA | 32 | 20 | | 22 | 22 | 21 |
| | CHA | | | 22 | | | |
| Monomer C | CTFA | 16 | 42 | 32 | | | 31 |
| | ACMO | | | | 32 | | |
| | MEDOL10 | | | | | 32 | |
| Other monomer | LA | | | | | | |
| | TMPTA | | | | | | |
| Polymerization inhibitor | ST-1 | 1.1 | 1.1 | 1.1 | 1.1 | 1.1 | 1.1 |
| Photopolymerization initiator | IRG184 | 2.4 | 2.4 | 2.4 | 2.4 | 2.4 | 2.4 |
| | IRG819 | 8.2 | 8.2 | 8.2 | 8.2 | 8.2 | 8.2 |
| | BP | 3.2 | 3.2 | 3.2 | 3.2 | 3.2 | 3.2 |
| Resin | Polymer 1 | | | | | | 2.0 |
| Surfactant | BYK307 | 0.1 | 0.1 | 0.1 | 0.1 | 0.1 | 0.1 |
| Total | | 100.0 | 100.0 | 100.0 | 100.0 | 100.0 | 100.0 |
| A + B | | 62.0 | 36.0 | 46.0 | 46.0 | 46.0 | 45.0 |
| A + B + C | | 78.0 | 78.0 | 78.0 | 78.0 | 78.0 | 76.0 |
| A/all monomers | | 36.5 | 19.5 | 29.2 | 29.2 | 29.2 | 30.0 |
| Evaluation results | Curability | B | A | A | A | A | A |
| | Surface stickiness suppressibility | A | B | A | A | A | A |
| | Ejectability | B | A | A | A | A | A |

TABLE 2

| | | Example 14 | Example 15 | Example 16 | Example 17 | Example 18 | Example 19 |
|---|---|---|---|---|---|---|---|
| C pigment dispersion | | 7 | 7 | 7 | 7 | 7 | 7 |
| Monomer A | NVO | 24 | 24 | | | 19 | 15 |
| | NVMO | | | 12 | 30 | | |
| Monomer B | IBOA | 20 | 20 | 34 | 20 | 37 | 26 |
| | CHA | | | | | | |
| Monomer C | CTFA | 24 | 24 | 32 | 28 | 22 | 37 |
| | ACMO | | | | | | |
| | MEDOL10 | | | | | | |
| Other monomer | LA | 10 | | | | | |
| | TMPTA | | 10 | | | | |
| Polymerization inhibitor | ST-1 | 1.1 | 1.1 | 1.1 | 1.1 | 1.1 | 1.1 |
| Photopolymerization initiator | IRG184 | 2.4 | 2.4 | 2.4 | 2.4 | 2.4 | 2.4 |
| | IRG819 | 8.2 | 8.2 | 8.2 | 8.2 | 8.2 | 8.2 |
| | BP | 3.2 | 3.2 | 3.2 | 3.2 | 3.2 | 3.2 |
| Resin | Polymer 1 | | | | | | |
| Surfactant | BYK307 | 0.1 | 0.1 | 0.1 | 0.1 | 0.1 | 0.1 |
| Total | | 100.0 | 100.0 | 100.0 | 100.0 | 100.0 | 100.0 |
| A + B | | 44.0 | 44.0 | 46.0 | 50.0 | 56.0 | 41.0 |
| A + B + C | | 68.0 | 68.0 | 78.0 | 78.0 | 78.0 | 78.0 |
| A/all monomers | | 29.2 | 29.2 | 14.6 | 36.5 | 23.1 | 18.3 |
| Evaluation results | Curability | A | A | B | B | A | A |
| | Surface stickiness suppressibility | A | A | A | A | A | A |
| | Ejectability | A | A | B | A | A | A |

TABLE 2-continued

|  |  | Comparative Example 1 | Comparative Example 2 | Comparative Example 3 | Comparative Example 4 | Comparative Example 5 |
|---|---|---|---|---|---|---|
| C pigment dispersion |  | 7 | 7 | 7 | 7 | 7 |
| Monomer A | NVO |  | 28 | 26 | 20 | 10 |
|  | NVMO |  |  |  |  |  |
| Monomer B | IBOA | 38 |  | 40 | 20 | 44 |
|  | CHA |  |  |  |  |  |
| Monomer C | CTFA | 28 | 38 |  | 18 | 4 |
|  | ACMO |  |  |  |  |  |
|  | MEDOL10 |  |  |  |  |  |
| Other monomer | LA | 12 | 12 | 12 | 20 | 20 |
|  | TMPTA |  |  |  |  |  |
| Polymerization inhibitor | ST-1 | 1.1 | 1.1 | 1.1 | 1.1 | 1.1 |
| Photopolymerization initiator | IRG184 | 2.4 | 2.4 | 2.4 | 2.4 | 2.4 |
|  | IRG819 | 8.2 | 8.2 | 8.2 | 8.2 | 8.2 |
|  | BP | 3.2 | 3.2 | 3.2 | 3.2 | 3.2 |
| Resin | Polymer 1 |  |  |  |  |  |
| Surfactant | BYK307 | 0.1 | 0.1 | 0.1 | 0.1 | 0.1 |
| Total |  | 100.0 | 100.0 | 100.0 | 100.0 | 100.0 |
| A + B |  | 38.0 | 28.0 | 66.0 | 40.0 | 54.0 |
| A + B + C |  | 66.0 | 66.0 | 66.0 | 58.0 | 58.0 |
| A/all monomers |  | 0.0 | 34.1 | 31.7 | 24.4 | 12.2 |
| Evaluation results | Curability | E | D | C | D | D |
|  | Surface stickiness suppressibility | C | D | B | B | A |
|  | Ejectability | B | C | E | C | E |

Notes on Table 1 and Table 2
Numerical values for components each mean a content (mass %) in each ink.
Blanks in Tables each mean the absence of the corresponding component.
Monomer A is a radical-polymerizable monomer represented by formula (A).
Monomer B is a radical-polymerizable monomer including an alicyclic structure and not including a heterocyclic structure.
Monomer C is a radical-polymerizable monomer including a heterocyclic structure.
"A+B" means the total content (mass %) of a monomer A and a monomer B.
"A+B+C" means the total content (mass %) of a monomer A, a monomer B, and a monomer C.
"A/all monomers" means the content (mass %) of a monomer A relative to the total content of all radical-polymerizable monomers contained in each ink. Here, the all monomers include the monomer (specifically, the above-mentioned SR9003, a bifunctional monomer) in the C pigment dispersion.

Abbreviations in Table 1 and Table 2

NVO: N-vinyloxazolidinone
NVMO: N-vinyl-5-methyloxazolidinone
IBOA: isobornyl acrylate
CHA: cyclohexyl acrylate
CTFA: cyclic trimethylolpropane formal acrylate
ACMO: acryloylmorpholine
MEDOL10: (2-methyl-2-ethyl-1,3-dioxolan-4-yl)methyl acrylate [manufactured by Osaka Organic Chemical Industry Ltd.]
LA: lauryl acrylate
TMPTA: trimethylolpropane triacrylate
ST-1: Firstcure ST-1 (polymerization inhibitor; tris(N-nitroso-N-phenylhydroxylamine) aluminum salt manufactured by Albemarle Corporation)
IRG184: IRGACURE184 (1-hydroxy-cyclohexyl-phenyl-ketone) manufactured by BASF
IRG819: IRGACURE819 (bis(2,4,6-trimethylbenzoyl)-phenylphosphine oxide) manufactured by BASF
BP: SPEEDCURE BP (benzophenone) manufactured by Lambson
BYK307: BYK-307 (silicone surfactant) manufactured by BYK-Chemie As shown in Table 1 and Table 2, in Examples, in each of which an ink containing a monomer A that is a radical-polymerizable monomer represented by formula (A), a monomer B that is a radical-polymerizable monomer including an alicyclic structure and not including a heterocyclic structure, and a monomer C that is a radical-polymerizable monomer including a heterocyclic structure, the total content of the monomer A, the monomer B, and the monomer C being 60 mass % or more relative to the total amount of the ink, was used, curability, surface stickiness suppressibility, and ejectability were high.

In contrast to Examples, in Comparative Example 1, in which the ink did not contain a monomer A, curability was low.

In Comparative Example 2, in which the ink did not contain a monomer B, curability and surface stickiness suppressibility were low.

In Comparative Example 3, in which the ink did not contain a monomer C, ejectability was low.

In Comparative Examples 4 and 5, in each of which the total content of a monomer A, a monomer B, and a monomer C in an ink was less than 60 mass % relative to the total amount of the ink, curability was low.

The results of Examples 1 to 19 show that when the content of a monomer A is 10 mass % to 30 mass % (Examples 1, 2, 4, and 6 to 19) relative to the total amount of an ink, curability is further improved.

The results of Examples 4 and 6 show that when the content of a monomer B is 20 mass % or more (Example 4)

relative to the total amount of an ink, surface stickiness suppressibility is further improved.

The results of Examples 7 and 18 show that when the content of a monomer B is 40 mass % or less (Example 18) relative to the total amount of an ink, ejectability is further improved.

The results of Examples 8 and 18 show that when the content of a monomer C is 20 mass % or more (Example 18) relative to the total amount of an ink, ejectability is further improved.

The results of Examples 9 and 19 show that when the content of a monomer C is 40 mass % or less (Example 19) relative to the total amount of an ink, surface stickiness suppressibility is further improved.

The results of Example 2, Example 19, and other Examples show that when the content of a monomer A is 15 mass % to 40 mass % (Example 19 and other Examples) relative to the total content of all radical-polymerizable monomers contained in an ink, curability is further improved.

In the above, Examples of inks containing a cyan pigment as a colorant have been described as Examples of the ink of the present disclosure.

It should be understood that the same effects as in Examples are produced also when the colorant in the ink of each Example described above is replaced with a colorant other than the cyan pigment (e.g., a magenta pigment, a yellow pigment, a black pigment, or a white pigment) and when substantially no colorant is contained.

The contents disclosed in JP2019-040324 filed in the Japan Patent Office on Mar. 6, 2019 are incorporated herein by reference in its entirety.

All documents, patent applications, and technical standards mentioned in this specification are incorporated herein by reference to the same extent as if each individual document, patent application, or technical standard was specifically and individually indicated to be incorporated by reference.

What is claimed is:

1. An ink jet ink composition comprising:
    a photopolymerization initiator comprising a plurality of different compounds in a combination of two or more;
    a polymerization inhibitor;
    a surfactant;
    a monomer A that is a radical-polymerizable monomer represented by formula (A):

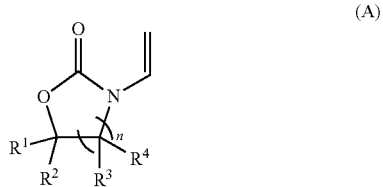

(A)

where $R^1$ to $R^4$ each independently represent a hydrogen atom or an organic group having 1 to 10 carbon atoms, the organic group being an alkyl group, an alkenyl group, an aryl group, or an aralkyl group, n represents an integer of 1 to 3, and when n is 2 or 3, two or three $R^3$'s may be the same or different, and two or three $R^4$'s may be the same or different;
    a monomer B that is a radical-polymerizable monomer including an alicyclic structure and not including a heterocyclic structure; and
    a monomer C that is a radical-polymerizable monomer including a heterocyclic structure and a (meth)acryloyl group,
    wherein a total content of the monomer A, the monomer B, and the monomer C is 60 mass % or more relative to a total amount of the ink jet ink composition,
    wherein a content of the monomer A is 10 mass % to 30 mass % relative to the total amount of the ink jet ink composition,
    wherein a content of the monomer B is 20 mass % to 40 mass % relative to the total amount of the ink jet ink composition,
    wherein a content of the monomer C is 20 mass % to 40 mass % relative to the total amount of the ink jet ink composition, and
    wherein the ink jet ink composition exhibits a curability such that, when a transfer substrate is peeled off of a solid image of a cured film of the ink jet ink composition after one day has elapsed, a transfer area is less than 25%, the transfer area being a proportion of an area of image transferred to the transfer substrate with respect to a total area of contact between the transfer substrate and the solid image.

2. The ink jet ink composition according to claim 1, wherein a total content of the monomer A and the monomer B is 35 mass % or more relative to the total amount of the ink jet ink composition.

3. The ink jet ink composition according to claim 1, wherein the content of the monomer A is 15 mass % to 40 mass % relative to a total content of all radical-polymerizable monomers contained in the ink jet ink composition.

4. The ink jet ink composition according to claim 1, further comprising a colorant.

5. An image recording method comprising:
    applying the ink jet ink composition according to claim 1 to a substrate by an ink jet method; and
    irradiating the ink jet ink composition applied to the substrate with an active radiation.

6. An image recorded article comprising:
    a substrate; and
    an image disposed on the substrate, the image being a cured product of the ink jet ink composition according to claim 1.

* * * * *